(12) United States Patent
Qiu et al.

(10) Patent No.: US 12,496,766 B2
(45) Date of Patent: Dec. 16, 2025

(54) METHODS OF 3D PRINTING THERMOSETTING POLYMERS AND CONTINUOUS FIBER COMPOSITES VIA IN-SITU SELF-PROPAGATION CURING AND SYSTEMS THEREOF

(71) Applicants: Texas Tech University System, Lubbock, TX (US); The Texas A&M University System, College Station, TX (US)

(72) Inventors: Jingjing Qiu, College Station, TX (US); Shiren Wang, College Station, TX (US)

(73) Assignees: Texas Tech University System, Lubbock, TX (US); The Texas A&M University System, College Station, TX (US)

(*) Notice: Subject to any disclaimer, the term of this patent is extended or adjusted under 35 U.S.C. 154(b) by 150 days.

(21) Appl. No.: 17/922,547

(22) PCT Filed: Apr. 30, 2021

(86) PCT No.: PCT/US2021/030229
§ 371 (c)(1),
(2) Date: Oct. 31, 2022

(87) PCT Pub. No.: WO2021/222785
PCT Pub. Date: Nov. 4, 2021

(65) Prior Publication Data
US 2023/0173744 A1    Jun. 8, 2023

Related U.S. Application Data
(60) Provisional application No. 63/019,078, filed on May 1, 2020.

(51) Int. Cl.
*B29C 64/106* (2017.01)
*B29C 64/264* (2017.01)
(Continued)

(52) U.S. Cl.
CPC .......... *B29C 64/106* (2017.08); *B29C 64/264* (2017.08); *B33Y 10/00* (2014.12);
(Continued)

(58) Field of Classification Search
CPC ... B29C 64/118; B29C 64/106; B29C 64/264; B33Y 10/00; B33Y 30/00; B33Y 50/02; B33Y 70/00; B33Y 80/00
See application file for complete search history.

(56) References Cited

U.S. PATENT DOCUMENTS 5,120,476 A * 6/1992 Scholz .................. B29C 64/135
156/273.5
5,573,721 A * 11/1996 Gillette .................. B33Y 10/00
118/712
(Continued)

FOREIGN PATENT DOCUMENTS

WO    2020070639 A1    4/2020
WO    2021222785 A1    11/2021

OTHER PUBLICATIONS

Kuang, X., et al., "High-Speed 3D Printing Of High-Performance Thermosetting Polymers Via Two-Stage Curing," Macromolecular Rapid Comm., 2018, 39(7), 1700809 ("Kuang 2018").
(Continued)

*Primary Examiner* — Jeffrey M Wollschlager
(74) *Attorney, Agent, or Firm* — Dickinson Wright PLLC; Ross Spencer Garsson

(57) ABSTRACT

Methods and systems of 3D printing non-photocurable thermosetting polymer materials and continuous fiber composites that reduces the manufacturing time and energy required
(Continued)

by implementing fast, self-sustaining, and self-propagating, in-situ curing of the polymer and the and continuous fiber composites as the non-photocurable thermosetting polymer materials are being printed.

22 Claims, 7 Drawing Sheets

(51) Int. Cl.
*B33Y 10/00* (2015.01)
*B33Y 30/00* (2015.01)
*B33Y 50/02* (2015.01)
*B33Y 70/00* (2020.01)
*B33Y 80/00* (2015.01)

(52) U.S. Cl.
CPC ............... *B33Y 30/00* (2014.12); *B33Y 50/02* (2014.12); *B33Y 70/00* (2014.12); *B33Y 80/00* (2014.12)

(56) References Cited

U.S. PATENT DOCUMENTS

| | | | |
|---|---|---|---|
| 5,895,771 A * | 4/1999 | Epstein | B01J 31/143 526/170 |
| 6,454,972 B1 * | 9/2002 | Morisette | C04B 35/63 264/236 |
| 6,838,035 B1 * | 1/2005 | Ederer | B22C 23/00 347/54 |
| 2003/0090034 A1 * | 5/2003 | Mulhaupt | B33Y 30/00 425/375 |
| 2005/0025905 A1 * | 2/2005 | Pan | B29C 64/40 427/372.2 |
| 2017/0251713 A1 * | 9/2017 | Warner | A23P 30/20 |
| 2018/0122570 A1 * | 5/2018 | Li | B33Y 10/00 |
| 2018/0311898 A1 | 11/2018 | Schwartzbaum et al. | |
| 2018/0327531 A1 * | 11/2018 | Moore | B33Y 30/00 |
| 2019/0240730 A1 * | 8/2019 | Haider | B33Y 30/00 |
| 2019/0275746 A1 * | 9/2019 | Huang | B29C 64/112 |
| 2019/0291350 A1 * | 9/2019 | Feinberg | A61L 27/443 |
| 2020/0198251 A1 * | 6/2020 | Huang | C08K 3/36 |
| 2020/0247053 A1 * | 8/2020 | Rodriguez | B29C 64/118 |
| 2022/0193980 A1 * | 6/2022 | Thomson | B29C 64/112 |
| 2022/0332040 A1 * | 10/2022 | Feinberg | B29C 64/209 |

OTHER PUBLICATIONS

Lei, D., et al., "A General Strategy Of 3D Printing Thermosets For Diverse Applications," Mater. Horiz., 2019, 6, 394-404 ("Lei 2019").
Wang, B., et al. "3D printing on in-situ curing thermally insulated thermosets", Manufacturing Letters, vol. 21, Aug. 1, 2019, pp. 1-6.
International Searching Authority, International Search Report and Written Opinion for PCT/US2021/030229; dated Aug. 3, 2021; 19 pages.
Patent Cooperation Treaty, International Preliminary Report on Patentability for PCT/US2021/030229; dated Oct. 27, 2022; 10 pages.

* cited by examiner

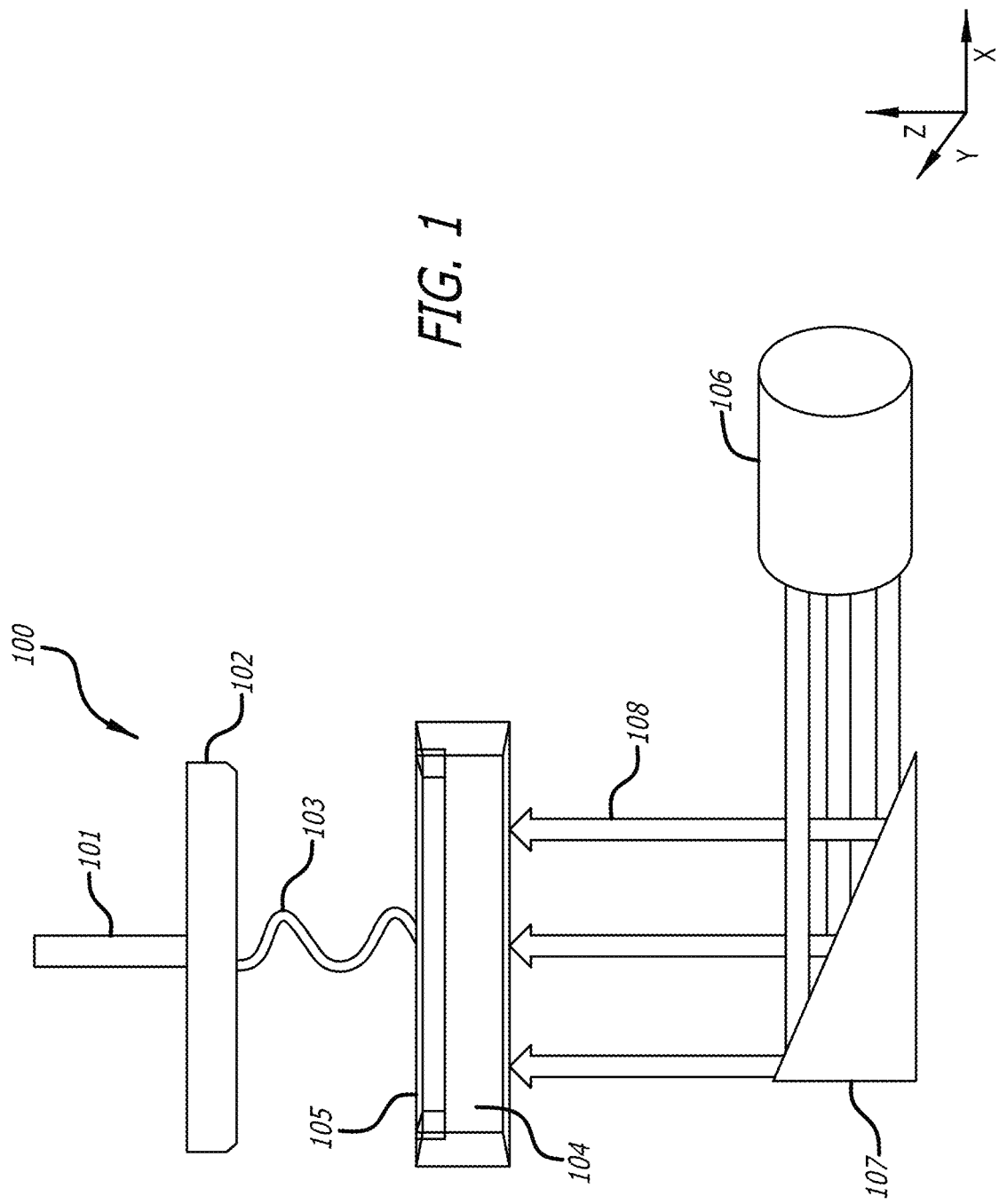

METHODS OF 3D PRINTING THERMOSETTING POLYMERS AND CONTINUOUS FIBER COMPOSITES VIA IN-SITU SELF-PROPAGATION CURING AND SYSTEMS THEREOF

RELATED PATENT APPLICATIONS

This application is a 35 U.S.C § 371 national application of PCT Application No. PCT/US21/30229, filed on Apr. 30, 2021, entitled "Methods Of 3D Printing Thermosetting Polymers And Continuous Fiber Composites Via In-Situ Self-Propagation Curing And Systems Thereof", which claims priority to U.S. Provisional Patent Application Ser. No. 63/019,078, filed on May 1, 2020, entitled "Method of 3D Printing Thermosetting Polymers and Continuous Fiber Composites Via In-Situ Self-Propagation Curing and Systems Thereof." These applications are commonly owned by the owner of the present invention and are hereby incorporated by reference in their entirety for all purposes.

GOVERNMENT INTEREST

This invention was made with government support under Grant Nos. 1933679 and 1934120 awarded by the National Science Foundation. The government has certain rights in the invention.

TECHNICAL FIELD

The present invention relates to the field of additive manufacturing, particularly method and systems for high-efficiency printing of 3D objects made from non-photocurable thermosetting polymers via in-situ self-propagation curing.

BACKGROUND

Polymers are materials made of long, repeating chains of molecules. These complex molecule chains exhibit unique properties depending on the type of molecules they are composed of, and how these molecules are bonded. While some polymers bend and stretch like rubber, others are hard and durable like epoxies and glass. Thermosetting polymers, such as epoxy resins, phenolic resins, and cyanate esters, are polymers which are irreversibly hardened by curing. Other thermosetting materials include benzoxazine and bismaleimide.

Curing a thermosetting resin transforms it into a plastic or elastomer (rubber) by crosslinking or chain extension through the formation of covalent bonds between individual chains of the polymer. Crosslink density varies depending on the monomer or prepolymer mix, and the mechanism of crosslinking.

The curing process—which generally involves the application of heat, radiation, high pressure, or a catalyst—results in a chemical reaction whereby cross-links (new chemical bonds) are formed between polymer chains, hardening them from liquids, or soft solids, into solids. Because the bonds formed through the curing process are unbreakable and irreversible, thermoset polymers are durable, highly impact resistant, and will not melt when exposed to extreme heat.

Thermoset polymers have a wide variety of applications in numerous markets, such as the aerospace, automotive, marine, energy, and coating industries, such as due to their lightweight, high-temperature durability and high-impact resistance.

Epoxy resins, for example, are commonly used in the manufacturing of adhesives, plastics, and paints. They are also used for the glossy, protective, outdoor coatings found on wood, metal, glass, stone, and other construction materials.

Because epoxy resins are excellent insulators, they maintain a prominent role in the electronics industry, and are commonly used in the production of motors, transformers, and generators. Phenolic resins are used in the production of billiard balls, circuit boards, brake pads, brake shoes, and clutch discs. Cyanate esters have a myriad of applications in the production of spacecrafts, aircrafts, missiles, antennae, microelectronics, and microwaves.

Traditional methods of thermoset polymer production involve synthesizing the desired polymer, placing the material into a mold, and applying a significant amount of heat (or one of the other curing methods identified above) to irreversibly harden the thermoset polymer into the desired shape for use. However, this process is often inefficient because of (1) the inherent difficulty in using molds to produce complex geometric shapes; and (2) the excessive amount of time and energy required to cure even a small amount of thermoset polymers. For example, The Boeing Company (Chicago, Illinois), which is the world's leading airplane manufacturer, made headlines in recent years for diminishing the use of aluminum and steel in their jetliners in favor of composite materials made of carbon fibers and epoxy resins. It has been reported that, to cure even a small piece of these epoxy-based composites for a fuselage, takes up to eight hours and 350 gigajoules of energy.

Non-photocurable thermosetting polymers are usually fabricated by conventional molding and subsequent thermal curing. It is very challenging to produce parts with complex geometry with non-photocurable thermosetting polymers.

Recent innovations in three-dimensional (3D) printing have presented a novel means of not only producing thermoset polymers, but also making the manufacturing process significantly more efficient. 3D printing allows for the layer-by-layer production of thermoset polymers in complex shapes without the use of traditional molds. However, this is still a two-step process because, after production, the newly formed polymer must still be cured—often in an oven or autoclave.

3D printing, which is also referred to as additive manufacturing (AM) and solid freeform fabrication (SFF), is a set of layer-by-layer processes for producing 3D objects directly from a digital model. The technology of additive manufacturing began several decades ago. 3D printing technology is used for prototyping and for distributed manufacturing with applications in, for example, architecture, construction (AEC), industrial design, automotive, aerospace, military, engineering, civil engineering, dental and medical industries, biotech (human tissue replacement), fashion, footwear, jewelry, eyewear, education, geographic information systems, food, and many other fields.

In general terms, 3D printing is a process that takes virtual blueprints from computer aided design (CAD) or animation modeling software and slices them into digital cross-sections for the machine to successively use as a guideline for printing. Depending on the machine used, material or a binding material is deposited until material/binder layering is complete and the final 3D model has been printed. When printing, the 3D printing machine reads the design and lays down successive layers of liquid, powder, paper, or sheet material to build the model from a series of cross-sections. These layers are joined or automatically fused to create the final shape. The fundamental advantage of additive manufacturing techniques is their ability to create almost any shape or geometric feature.

In 3D printing machines that use an extrusion deposition process (also known as Fused Filament Fabrication (FFF)), a plastic filament (typically wound on a coil and unreeled to supply material) is used and is applied through an extrusion nozzle, which regulates the flow of the molten plastic bead by controlling the filament feed rate. The extrusion nozzle heats to melt the material (or otherwise renders the material flowable). The extrusion nozzle can be moved in both horizontal and vertical directions by a computer-controlled mechanism. Alternatively, the printer platform bed may be moved relative to the extrusion nozzle, or coordinated movements of both the nozzle and platform may be used to achieve the desired extrusion path in the x-, y-, and z-directions. The model or part is produced by extruding small beads of thermoplastic material to form consecutive layers in the vertical (i.e., z) direction. The material hardens immediately after extrusion from the extrusion nozzle. Various polymers are used in such an extrusion deposition process, including, but not limited to, the following: acrylonitrile butadiene styrene (ABS), polycarbonate (PC), polylactic acid (PLA), high density polyethylene (HDPE), PC/ABS, and polyphenylsulfone (PPSU). Generally, the polymer is in the form of a filament, fabricated from virgin resins.

3D printing of high-performance thermosetting polymers is generally a two-step process (like molding-based process): printing the structure and subsequently ex-situ thermal curing in ovens or autoclaves. Traditional molding and current 3D printing of high-performance thermosets both require structure formation and ex-situ curing at high-temperature and extended curing time (usually several hours), and thus such ex-situ curing process consumes an excessive amount of energy.

Additionally, commonly used 3D printers, such as stereolithography (SLA), and digital light processing (DLP) are impractical for producing non-photocurable thermoset polymers, and CLIP Carbon 3D printers are impractical as well because they require what is known as a "dead zone" and the continuous use of photo energy for polymerization.

The current methods of 3D printing are only effective on photocurable polymers. See, e.g., Schwartzbaum '898 Application, and Lei 2019. Moreover, thermosetting polymers generally require additional curing post-fabrication. See Kuang 2018. Accordingly, the need remains for a method to print 3D objects of non-photocurable thermosetting materials that cure during the 3D printing processes.

SUMMARY OF THE INVENTION

The present invention is directed to an efficient method and systems of producing thermoset polymers and continuous fiber composites through the use of extrusion-based 3D printing of non-photocurable thermosetting polymer materials, and in-situ self-curing. The present invention employs an initialized exothermic reaction with in-situ polymerization occurring at the point where the 3D printer's air and liquid resins meet. These methods and systems produce complex thermoset polymers that do not require additional curing, thereby saving significant energy, cost, and manufacturing time. In addition to being more efficient, this unique 3D printing curing method is self-sustaining and self-propagating, and can cure the thermosetting polymer material layer-by-layer during the printing process.

In general, in one aspect, the invention features a three-dimensional (3D) printing method. The 3D method includes fabricating a 3D object from a non-photocurable thermosetting material. The fabrication includes utilizing a 3D printer to extrude the non-photocurable thermosetting material and form the three-dimensional object layer-by-layer. The 3D method further includes that, during fabrication of the 3D object utilizing the 3D printer, initializing an exothermic reaction that results in the in-situ polymerization of the thermosetting polymer material. The in-situ polymerization cures the thermosetting polymer material to a thermoset polymer that does not required further curing to fabricate the 3D object comprising the thermoset polymer.

Implementations of the invention can include one or more of the following features:

The non-photocurable thermosetting material can be selected from a group consisting of non-photocurable thermosetting epoxy resins, non-photocurable thermosetting phenolic resins, non-photocurable thermosetting cyanate esters, benzoxazine, bismaleimide, and combinations thereof.

The initializing of the exothermic reaction can occur at an interface between a liquid resin and air. The surface of the layers of the three-dimensional object can be positioned at the interface.

The exothermic reaction can occur by the application of a light source at the interface.

The application of the light source can be controlled using an optical signal guide curing window.

The exothermic reaction can be initiated photonically.

The exothermic reaction can be a chemical reaction of the liquid resin and the air caused by the adsorption of light.

The in-situ polymerization of the thermosetting polymer material can be self-sustaining.

The in-situ polymerization of the thermosetting polymer material can be self-propagating.

The in-situ polymerization of the thermosetting polymer material can be self-sustaining and self-propagating.

The 3D object can be selected from a group consisting of articles utilized in the aerospace, automotive, marine, energy and coating industries.

The 3D object can have a characteristic selected from the group consisting of lightweight, high-temperature durability, high-impact resistance, and combinations thereof.

The non-photocurable thermosetting material can include a non-photocurable thermosetting epoxy resins.

The 3D object can be an article selected from a group consisting of electronic parts, motors, transformers, and generators.

The non-photocurable thermosetting material can include a non-photocurable thermosetting phenolic resin.

The 3D object can be an article selected from a group consisting of billiard balls, circuit boards, brake pads, brake shoes, and clutch discs.

The non-photocurable thermosetting material can include a non-photocurable thermosetting cyanate ester.

The 3D object can be an article selected from a group consisting of spacecrafts, aircrafts, missiles, antennae, microelectronics, and microwaves.

The 3D printing method can utilize a curing agent.

The curing agent can include a first component and a second component. The molar ratio of the first component to the second component can be at a ratio between 2:0.01 and 2:0.1.

The molar ratio of the first component, the second component, and the non-photocurable thermosetting material can be between 2:0.01:100 and 2:0.1:100.

The first component can be 1,1,2,2-tetraphenyl-1, 2-ethandiol (I-TI). The second component can be fluorinated alkoxyaluminate (I-Al).

The curing agent can include one or both of 1,1,2,2-tetraphenyl-1, 2-ethandiol (I-TI) and fluorinated alkoxyaluminate (I-Al).

The non-photocurable thermosetting material can include a non-photocurable thermosetting epoxy resins.

The 3D printing method can utilize a continuous fiber printing process.

In general, in another aspect, the invention features a 3D object made from at least one of the above-described 3D printing methods.

In general, in another aspect, the invention features a three-dimensional (3D) printing system. The 3D printing system includes a source of a non-photocurable thermosetting material. The 3D printing system further includes a platform comprising an extruder head. The source of the non-photocurable thermosetting materials is operatively connected to the extruder head so that the non-photocurable thermosetting materials can be extruded through the extruder head. The platform is movable in at least two-directions so that it can build a 3D object layer-by-layer utilizing the non-photocurable thermosetting materials can be extruded through the extruder head. The 3D printing system further includes a source of liquid resin. The 3D printing system further includes a liquid resin-air interface. The source of the liquid-resin is operably connect to provide for the flow of liquid resin at the liquid-resin interface. The 3D printing system further includes a light source. The light source is operable to produce light that is operable to be transmitted to the liquid resin-air interface. During the building of the 3D object, the liquid-resin and the air are operable to initiate an exothermic reaction at the layers of the 3D object at the interface, resulting in the in-situ polymerization of the thermosetting polymer material. The in-situ polymerization is operable to cure the thermosetting polymer material to a thermoset polymer that does not required further curing to fabricate the 3D object including the thermoset polymer.

Implementations of the invention can include one or more of the following features:

The 3D object is at least one of the above-described 3D objects.

The 3D printing system is a continuous fiber printing process system.

The 3D printing system can further include an optical signal guide curing window positioned at or by the liquid resin-air interface. The optical signal guide curing window can be operable for permitting produced light from the light source to be transmitted to the liquid resin-air interface.

The optical signal guide curing window can be controlled to change the geometry and/or size of the 3D object.

DESCRIPTION OF DRAWINGS

FIG. 1 is schematic for a 3D printer of the present invention.

DETAILED DESCRIPTION

Figure 2A:
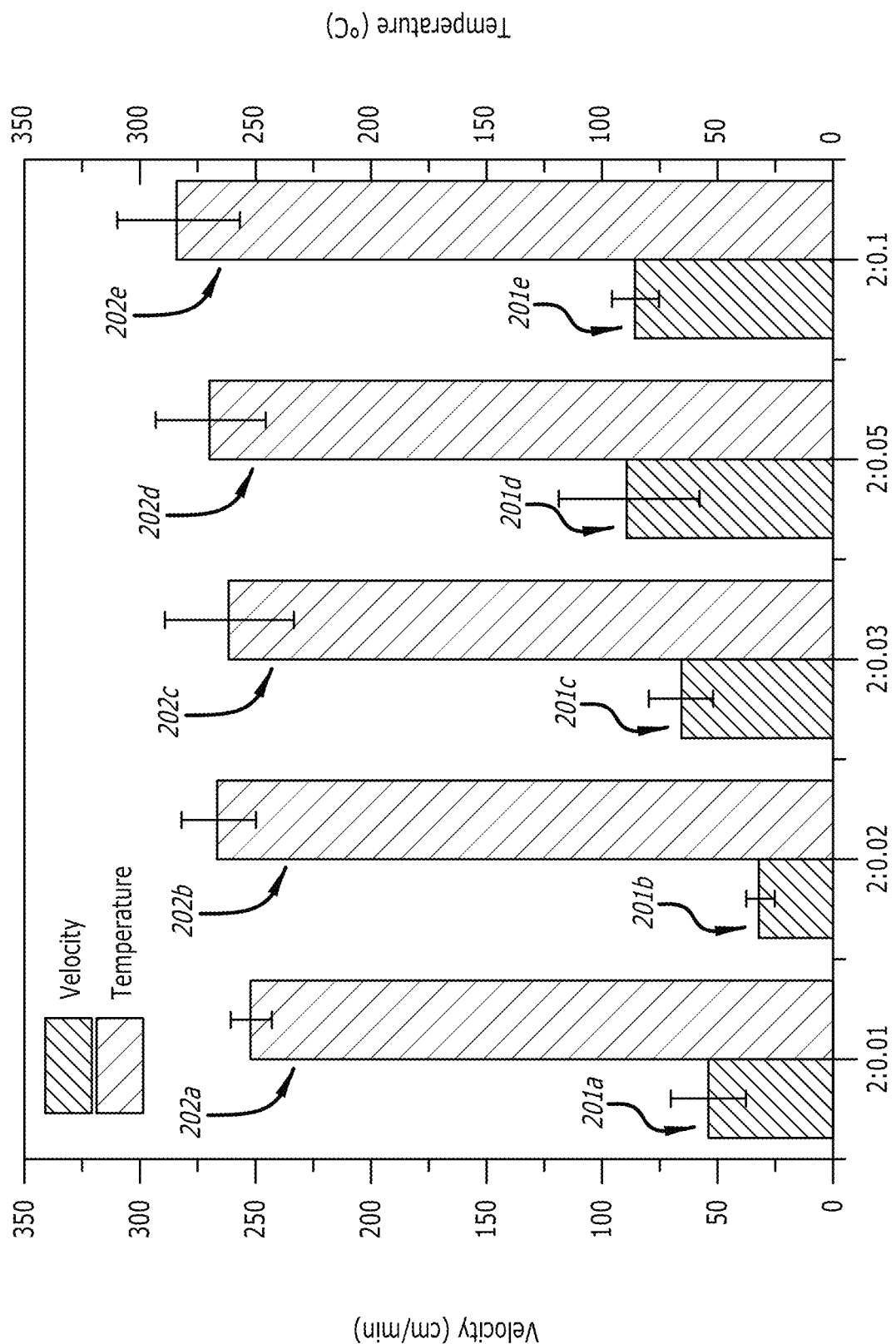
FIG. 2A is a graph showing the effect of the ratio of curing agents of 1,1,2,2-tetraphenyl-1, 2-ethandiol (I-TI), and fluorinated alkoxyaluminate (I-Al) on frontal temperature and frontal velocity.

The present invention is related to an efficient method and systems of producing thermoset polymers through the use of extrusion-based 3D printing of non-photocurable thermosetting materials, and in-situ self-curing. FIG. 1 shows a 3D printing system 100 that includes a platform 101 that can move in the x-, y-, and z-directions. Platform 101 has an extrusion head 102 in which the thermosetting polymer materials 103 are extruded during the fabrication process to form the solid-printed part by building it layer-by-layer. The thermosetting polymer materials 103 are a non-photocurable thermosetting material (such as epoxy resins, phenolic resins, cyanate esters, benzoxazine, bismaleimide) or a composite that includes one or more non-photocurable thermosetting materials. Thermosetting polymer materials 103 are flowable materials having a high viscosity that can be extruded through extrusion head 102 to provide for formation of the printed part.

As the printed part is being fabricated, it comes in contact with the liquid resin 104 at interface 105. The liquid resin is photocurable material. Interface 105 is the interface between liquid resin and air. A light source 106 produces light that is reflected by mirrors 107 toward interface 105. The light initializes an exothermic reaction at interface 105 (by the photocuring of the liquid resin 104), which the results in the in-situ polymerization of the thermosetting polymer material 103 occurring at the interface 105 (i.e., where the 3D printer's air and liquid resins meet). This curing of the thermosetting polymer 103 is both self-sustaining and self-propagating along the printed layers during 3D printing process.

Via such in-situ polymerization, thermosetting polymer materials 103, which are non-photocurable, are then cured, eliminating the "dead zone" and the continuous use of photo energy for polymerization, which would otherwise be required.

In some embodiments, an optical signal guided curing window (not shown) at interface 105 can be used for precise control and can depend upon the geometry/size of the printed 3D object.

Figure 2B:
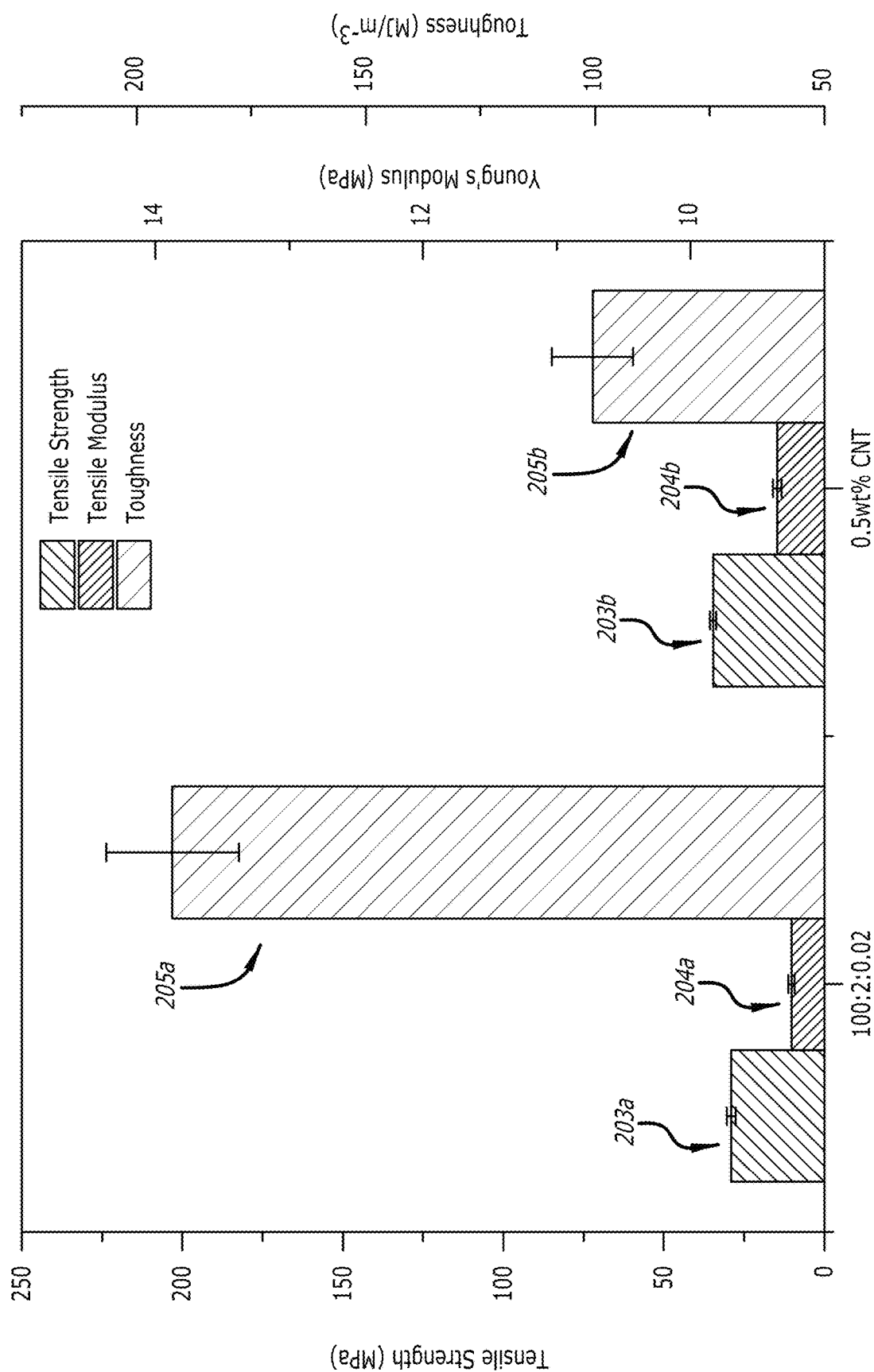
FIG. 2B is a graph showing the tensile strength and toughness of an as-printed epoxy resin and carbon nano-tubes-filled epoxy resin.

In one exemplary embodiment, a mixture of 1,1,2,2-tetraphenyl-1, 2-ethandiol (I-TI), and fluorinated alkoxyaluminate (I-Al) was used as the curing agent. The effect of TPED and IOC-8 $AlF_6$ ratio on the frontal velocity and frontal temperature is shown in FIG. 2A. The x-axis in the graph of FIG. 2A shows the molar ratio of I-TI to I-Al per 100 molar epoxy resin. (Bars 201a-201e show, respectively, the frontal velocity for molar ratios 2:0.01, 2:0.02, 2:03, 2:05, and 2:01, and bars 202a-202e show, respectively, the frontal temperature for molar ratios 2:0.01, 2:0.02, 2:03, 2:05, and 2:01). At the molar ratio of 2:0.02, the frontal velocity showed around 25 cm/min. For this 2:0.02 molar ratio, the tensile test of as-printed epoxy resins and carbon nanotubes-filled epoxy resins (0.5 wt. % carbon nanotubes) are shown in FIG. 2B. (Bars 203a, 204a, and 205a, show, respectively, the tensile strength, tensile modulus, and toughness of the as-printed epoxy resins; and bars 203b, 204b, and 205b, show, respectively, the tensile strength, tensile modulus, and toughness of the carbon nanotubes-filled epoxy resins). As-printed epoxy resin showed tensile strength ~26 MPa and toughness 200 MPa, which is comparable to the molding process.

Figure 3A:
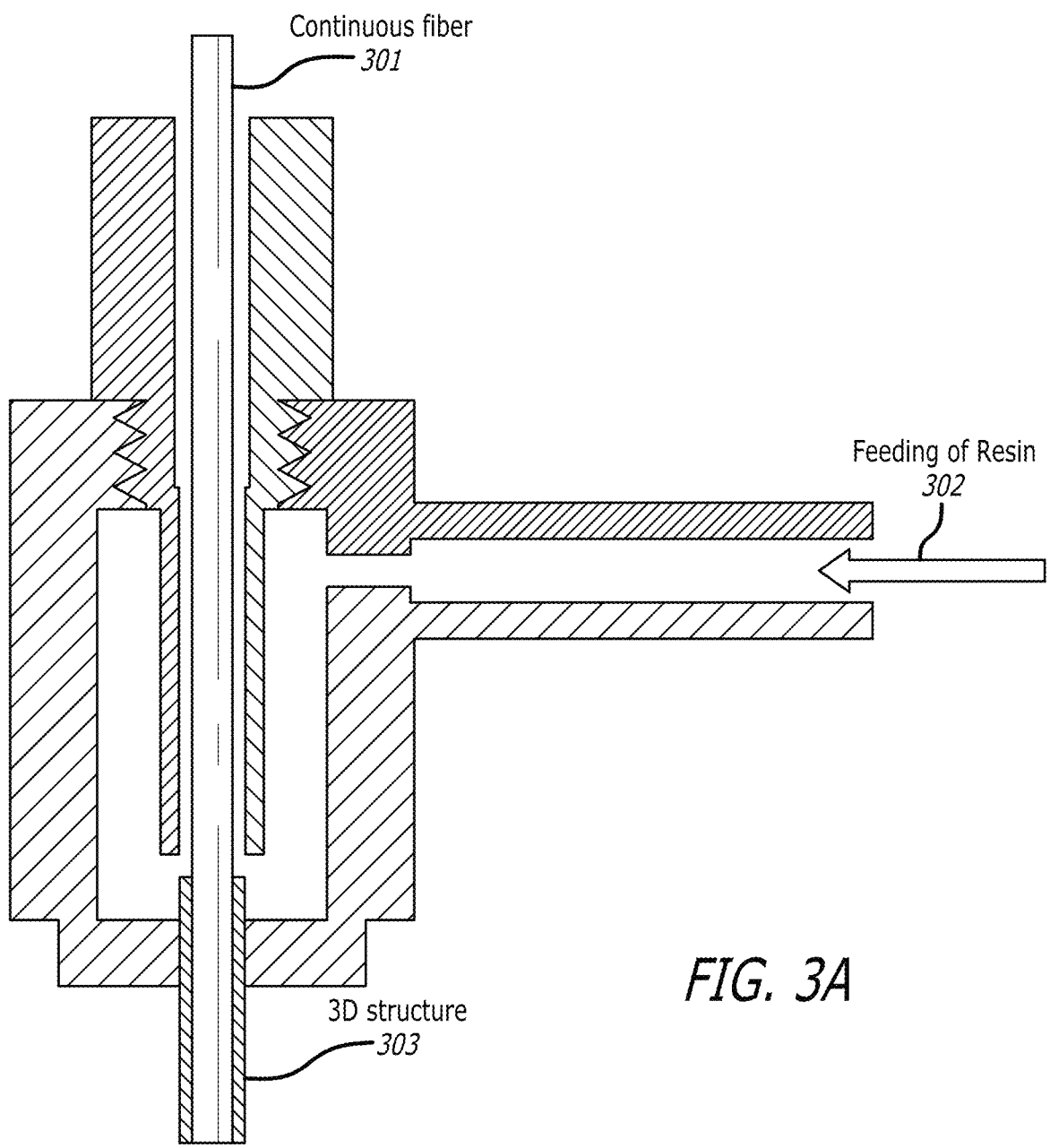
FIG. 3A is an illustration of a setup for incorporating the present invention with continuous fiber printing.
Figure 3B:
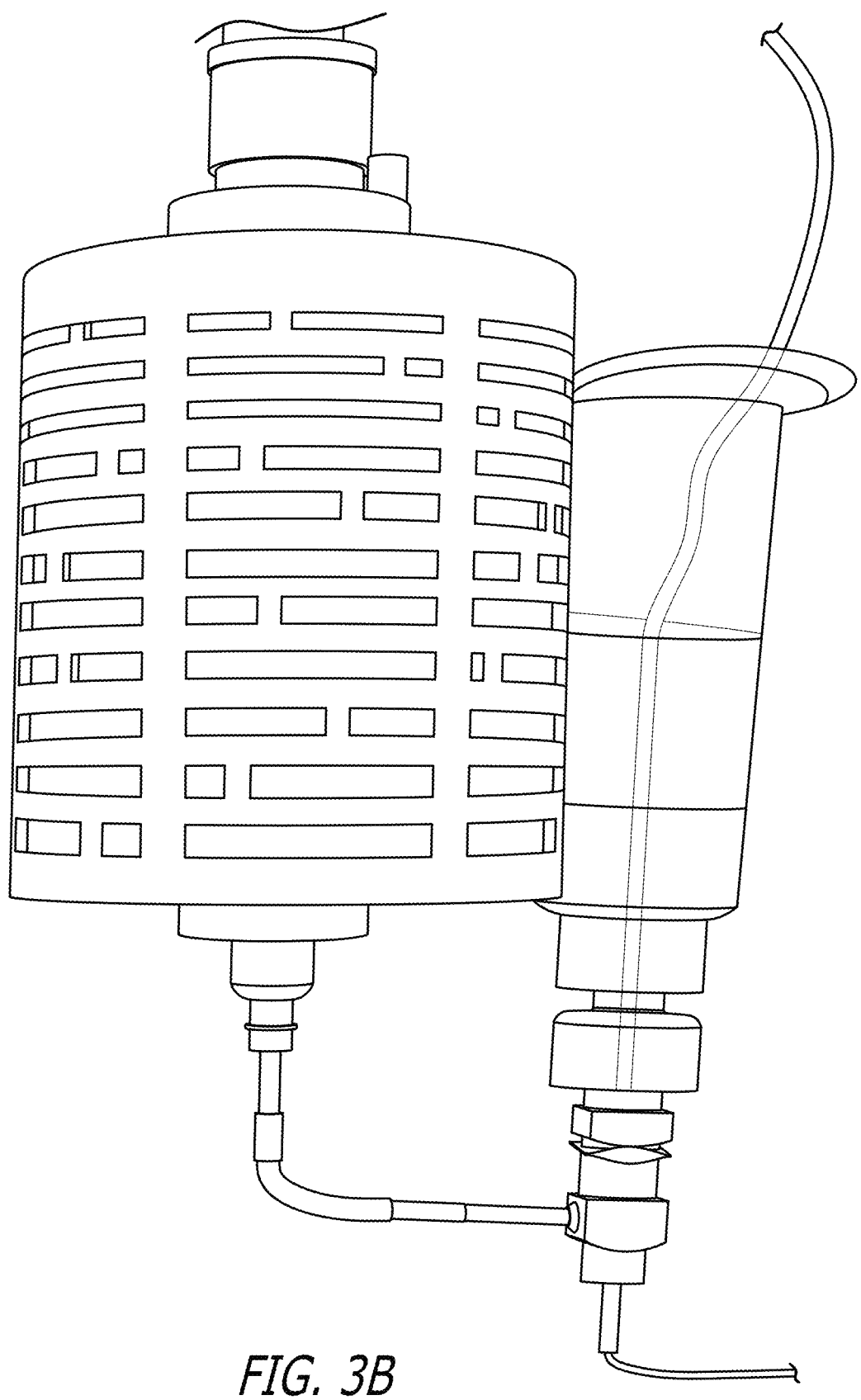
FIG. 3B is a photograph of the setup illustrated in FIG. 3A.

The present invention can be incorporated into a continuous fiber printing process. FIG. 3A shows an illustration of the setup that can be utilized, in which continuous fiber 301 and feed resin 302 are utilized to print 3D structure 303. FIG. 3B is a photograph of the setup illustrated in FIG. 3A.

Figure 4A:
FIGS. 4A-4C are photographs of different 3D structures that were printed utilizing embodiments of the present invention.
Figure 4B:
Figure 4C:
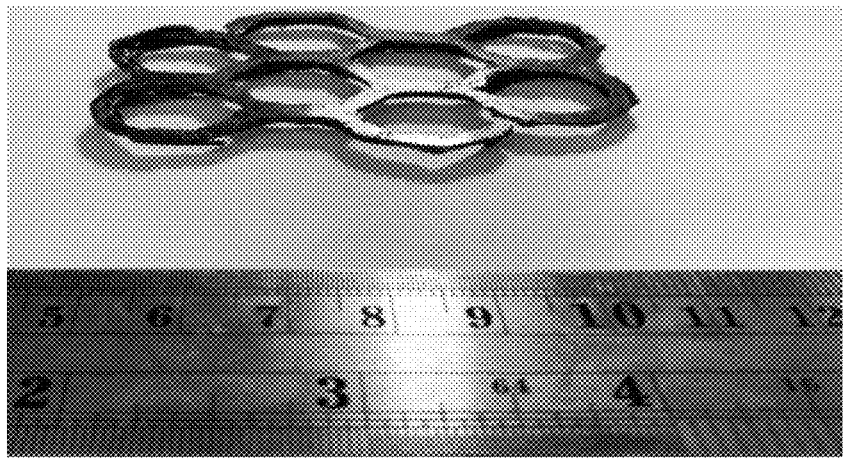

Using embodiments of the present invention, different 3D structures were printed with extrusion pressure of 3 psi (I-TI: I-Al=2:0.02). Examples of such different structures are shown in FIGS. 4A-4C.

Figure 5:
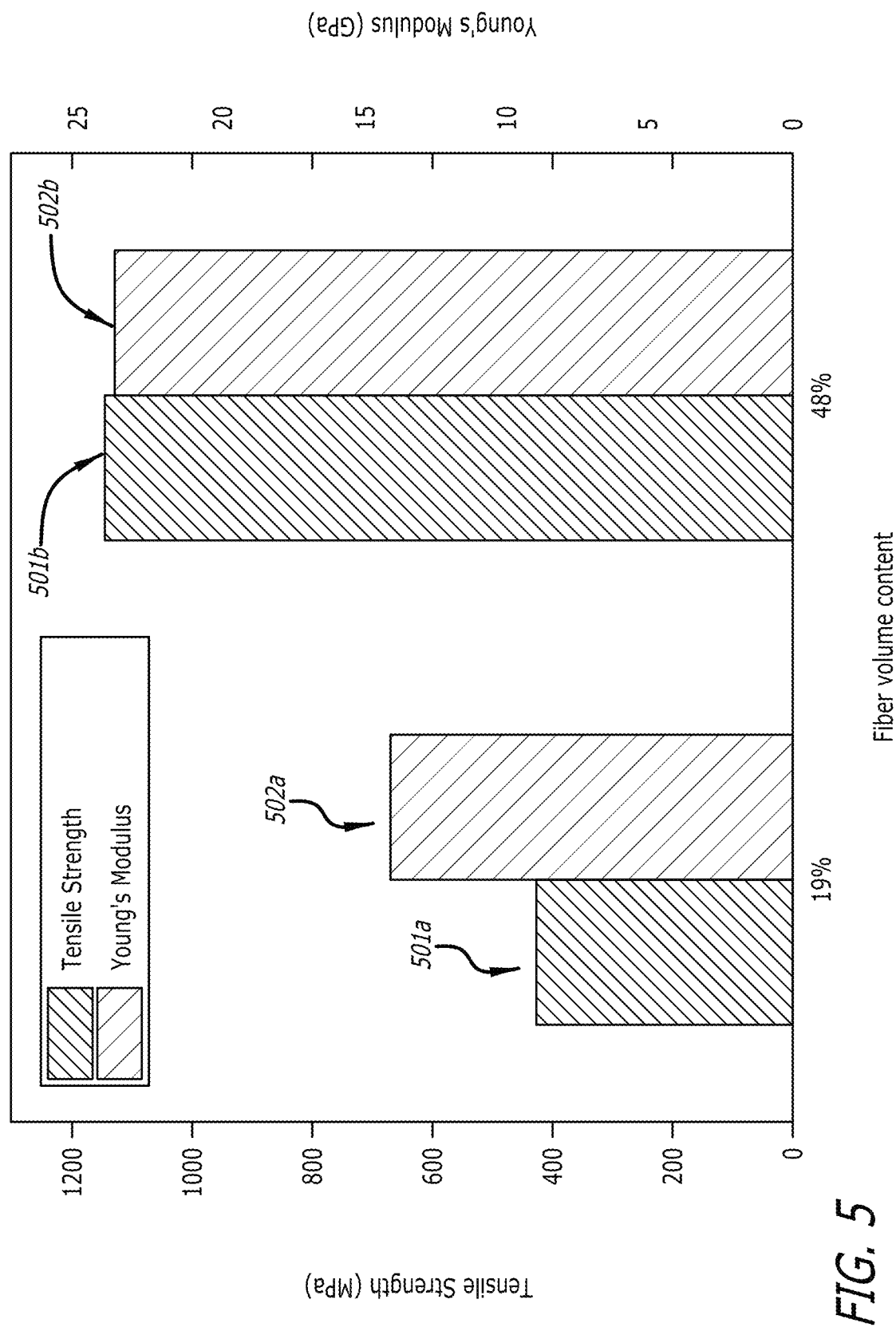
FIG. 5 is a graph showing the tensile strength of as-printed continuous fiber composites.

The tensile strength of continuous fiber composites printed as-printed using embodiments of the present invention, which results are shown in FIG. 5. (Bars 501a-501b show the tensile strength for embodiments with fiber volume content of 19% and 48%, respectively; and bars 502a-5012 show the Young's modulus for embodiments with fiber volume content of 19% and 48%). Such tensile strengths of these as-printed continuous fiber composites are comparable to continuous fiber composites fabricated by other current molding methods.

Such systems and methods produce 3D objects made of complex thermoset polymers that do not require additional curing, thereby saving significant energy, cost, and manufacturing time. Such systems and methods employ curing methods that are far more cost effective than current methods. This increases efficiency without sacrificing quality or performance.

In addition to being more efficient, this unique 3D printing systems and methods utilize curing methods that are self-sustaining and self-propagating, curing the thermosetting polymer, or composite material, layer-by-layer during the printing process. Such systems and methods quickly producing complex thermoset polymers without the need for molds or lengthy, expensive, energy-consuming curing. This also does not require the use of a bath or other direct heat source to thermally cure the thermosetting polymer material.

Such methods and systems of the present invention provide for the design and manufacturing of high-performance lightweight thermosetting composites, and can be used in a variety of applications, including aerospace, automotive, marine, energy and coating industries due to their lightweight, high-temperature durability and high-impact resistance.

REFERENCES

U.S. Patent Appl. Publ. No. 2018/0311898, entitled "A Curing System For Printing Of 3D Objects," published Nov. 1, 2018, to A. Schwartzbaum et al. ("Schwartzbaum '898 Application").

Lei, D., et al., "A General Strategy Of 3D Printing Thermosets For Diverse Applications," Mater. Horiz., 2019, 6, 394-404 ("Lei 2019").

Kuang, X., et al., "High-Speed 3D Printing Of High-Performance Thermosetting Polymers Via Two-Stage Curing," Macromolecular Rapid Comm., 2018, 39(7), 1700809 ("Kuang 2018").

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" and "substantially" when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

What is claimed is:

1. A three-dimensional (3D) printing method comprising:
   (a) fabricating a 3D object from a non-photocurable thermosetting material, wherein the fabrication comprises utilizing a 3D printer to extrude the non-photocurable thermosetting material and form the three-dimensional object layer-by-layer; and (b) during fabrication of the 3D object utilizing the 3D printer, initializing an exothermic reaction that results in the in-situ polymerization of the non-photocurable thermosetting material, wherein
   (i) the in-situ polymerization cures the non-photocurable thermosetting material to a thermoset polymer that does not require further curing to fabricate the 3D object comprising the thermoset polymer,
   (ii) the initializing of the exothermic reaction occurs at an interface between a photocurable liquid resin and air,
   (iii) the exothermic reaction occurs by the application of a light source at the interface, and
   (iv) the surface of the layers of the three-dimensional object are positioned at the interface.

2. The 3D printing method of claim 1, wherein the non-photocurable thermosetting material is selected from a group consisting of non-photocurable thermosetting epoxy resins, non-photocurable thermosetting phenolic resins, non-photocurable thermosetting cyanate esters, benzoxazine, bismaleimide, and combinations thereof.

3. The 3D printing method of claim 1, wherein the application of the light source is controlled using an optical signal guide curing window.

4. The 3D printing method of claim 1, wherein the exothermic reaction is initiated photonically.

5. The 3D printing method of claim 1, wherein the exothermic reaction is a chemical reaction of the liquid resin and the air caused by the adsorption of light.

6. The 3D printing method of claim 1, wherein the in-situ polymerization of the non-photocurable thermosetting material is self-sustaining.

7. The 3D printing method of claim 1, wherein the in-situ polymerization of the non-photocurable thermosetting material is self-propagating.

8. The 3D printing method of claim 1, wherein the in-situ polymerization of the non-photocurable thermosetting material is self-sustaining and self-propagating.

9. The 3D printing method of claim 1, wherein the 3D object is selected from a group consisting of articles utilized in the aerospace, automotive, marine, energy and coating industries.

10. The 3D printing method of claim 1, wherein the non-photocurable thermosetting material comprises a non-photocurable thermosetting epoxy resin.

11. The 3D printing method of claim 10, wherein the 3D object is an article selected from a group consisting of electronic parts, motors, transformers, and generators.

12. The 3D printing method of claim 1, wherein the non-photocurable thermosetting material comprises a non-photocurable thermosetting phenolic resin.

13. The 3D printing method of claim 12, wherein the 3D object is an article selected from a group consisting of billiard balls, circuit boards, brake pads, brake shoes, and clutch discs.

14. The 3D printing method of claim 1, wherein the non-photocurable thermosetting material comprises a non-photocurable thermosetting cyanate ester.

15. The 3D printing method of claim 14, wherein the 3D object is an article selected from a group consisting of spacecrafts, aircrafts, missiles, antennae, microelectronics, and microwaves.

16. The 3D printing method of claim 1, wherein the 3D printing method utilizes a curing agent.

17. The 3D printing method of claim 16, wherein
(a) the curing agent comprises a first component and a second component, and
(b) molar ratio of the first component to the second component is at a ratio between 2:0.01 and 2:0.1.

18. The 3D printing method of 17, wherein the molar ratio of the first component, the second component, and the non-photocurable thermosetting material is between 2:0.01:100 and 2:0.1:100.

19. The 3D printing method of claim 17, wherein
(a) the first component is 1,1,2,2-tetraphenyl-1,2-ethandiol (I-TI), and
(b) the second component is fluorinated alkoxyaluminate (I-Al).

20. The 3D printing method of claim 16, wherein the curing agent comprises one or both of 1,1,2,2-tetraphenyl-1,2-ethandiol (I-TI) and fluorinated alkoxyaluminate (I-Al).

21. The 3D printing method of claim 16, wherein the non-photocurable thermosetting material comprises a non-photocurable thermosetting epoxy resins.

22. The 3D printing method of claim 1, wherein the 3D printing method utilizes a continuous fiber printing process.

* * * * *